United States Patent
Sidhu et al.

(10) Patent No.: US 7,326,373 B2
(45) Date of Patent: Feb. 5, 2008

(54) METHOD FOR FORMING A WAFER FOR USE IN AN OPTICAL PART

(75) Inventors: Jotinderpal Sidhu, Irvine, CA (US); Thomas A. Balch, Rancho Palos Verdes, CA (US)

(73) Assignee: Younger Mfg. Co., Torrance, CA (US)

( * ) Notice: Subject to any disclaimer, the term of this patent is extended or adjusted under 35 U.S.C. 154(b) by 566 days.

(21) Appl. No.: 10/435,402

(22) Filed: May 9, 2003

(65) Prior Publication Data
US 2004/0222537 A1 Nov. 11, 2004

(51) Int. Cl.
*B29D 11/00* (2006.01)
*G02B 5/00* (2006.01)
*G02B 3/00* (2006.01)

(52) U.S. Cl. .............. 264/1.31; 264/2.7; 264/1.32; 264/1.8

(58) Field of Classification Search .............. 264/1.31, 264/1.32, 2.7, 1.7, 1.8
See application file for complete search history.

(56) References Cited

U.S. PATENT DOCUMENTS

| | | | | |
|---|---|---|---|---|
| 1,518,405 A | * | 12/1924 | Glancy ........................ 351/169 |
| 3,051,054 A | | 8/1962 | Crandon ........................ 88/65 |
| 3,994,760 A | | 11/1976 | Park ............................ 156/102 |
| 4,088,711 A | * | 5/1978 | Gergen et al. .............. 525/92 E |
| 4,118,454 A | * | 10/1978 | Miki et al. .................... 264/554 |
| 4,923,758 A | | 5/1990 | Marks et al. ................ 428/437 |
| 4,950,445 A | * | 8/1990 | Salce et al. .................. 264/549 |
| 5,049,427 A | | 9/1991 | Starzewski et al. .......... 428/40 |
| 5,051,309 A | | 9/1991 | Kawaki et al. .............. 428/332 |
| 5,084,226 A | | 1/1992 | Tarlton et al. .............. 264/316 |
| 5,232,637 A | * | 8/1993 | Dasher et al. .............. 264/1.32 |
| 5,412,505 A | * | 5/1995 | van Ligten et al. ......... 359/483 |
| 5,434,707 A | | 7/1995 | Dalzell et al. .............. 359/485 |
| 5,531,940 A | * | 7/1996 | Gupta et al. ................. 264/1.7 |
| 5,620,635 A | * | 4/1997 | DeRozier et al. ............ 264/2.5 |
| 5,641,372 A | | 6/1997 | Okuno ....................... 156/230 |
| 5,751,481 A | | 5/1998 | Dalzell et al. .............. 359/485 |
| 5,800,744 A | * | 9/1998 | Munakata .................... 264/1.7 |
| 5,808,721 A | * | 9/1998 | Wood et al. ................ 351/159 |
| 5,827,614 A | | 10/1998 | Bhalakia et al. ......... 428/411.1 |

(Continued)

FOREIGN PATENT DOCUMENTS

EP  0 299 509 B1  6/1994

(Continued)

OTHER PUBLICATIONS

Merriam-Webster's Collegiate Dictionary, Tenth Edition, Merriam-Webster, Inc., 1998, pp. 1174 and 608.*

*Primary Examiner*—Christina Johnson
*Assistant Examiner*—Matthew J. Daniels
(74) *Attorney, Agent, or Firm*—Sheppard, Mullin, Richter & Hampton LLP

(57) ABSTRACT

An improved method is disclosed, for forming a wafer into a complex, curved shape, for use in an optical part. The method includes a step of moving the wafer into contact with a molding surface having a predetermined non-cylindrical, aspheric curved shape, to form the wafer into a corresponding shape. The step of moving is sufficient, by itself, to form the wafer into the desired non-cylindrical, aspheric curved shape, without the need for additional forming steps.

31 Claims, 4 Drawing Sheets

U.S. PATENT DOCUMENTS

| | | | |
|---|---|---|---|
| 5,997,139 A | 12/1999 | Yasuda | 351/49 |
| 6,177,032 B1 | 1/2001 | Smith et al. | 264/1.34 |
| 6,180,033 B1 * | 1/2001 | Greshes | 264/1.32 |
| 6,256,152 B1 | 7/2001 | Coldrey et al. | 359/642 |
| 6,319,433 B1 * | 11/2001 | Kohan | 264/1.32 |
| 6,432,327 B2 | 8/2002 | Beeloo et al. | 264/1.34 |
| 2001/0038438 A1 | 11/2001 | Beeloo et al. | 351/162 |
| 2002/0036359 A1 | 3/2002 | Yamamoto et al. | 264/1.34 |
| 2002/0080488 A1 | 6/2002 | Nakagoshi | 359/488 |

FOREIGN PATENT DOCUMENTS

| | | |
|---|---|---|
| JP | 56-013139 | 2/1981 |
| JP | 63-061203 | 3/1988 |

* cited by examiner

METHOD FOR FORMING A WAFER FOR USE IN AN OPTICAL PART

BACKGROUND OF THE INVENTION

This invention relates generally to the manufacture of optical parts and, more particularly, to methods for forming wafers into a complex shape that complements the curvature of an optical part into which the formed wafer is incorporated.

Good optical performance is essential for high-quality prescription and non-prescription eyewear, but several other factors frequently can affect the choice of lens design and materials. For instance, lightweight materials might be important for wearer's comfort and convenience. Fashion consideration might dictate lens shapes, such as highly curved "wrap-around" designs, and lens colors. Similarly, lenses having specific optical attributes might be desirable. For instance, lenses that are polarized are specifically designed for effective attenuation of reflected glare. This can be particularly important for better visibility in bright, snowy, hazy or wet conditions. Thus, many factors should be considered when designing and producing high-quality eyewear.

One approach to producing a lightweight polarizing lens combines a polarizing wafer, which has polarizing material sandwiched between protective layers, and thermoplastic material such as polycarbonate. One representative manufacturing technique involves melting or fusing the thermoplastic polycarbonate with the wafer, via an injection-molding process. To provide the power—and lack of distortion—necessary for good vision, lenses must have precisely curved shapes. It is therefore essential that manufactured lenses exactly replicate the shape of the desired mold.

Exact replication can be a manufacturing challenge for any lens production, but the challenge becomes even more difficult when the lens incorporates a wafer that must assume a controlled and complex shape. One approach to avoid this difficulty in the past has been to embed the wafer deeper into the optical part, below the complex curved outer surface, such that the wafer may be flat or simply curved while the outer surface has the complex curvature needed for the correct optical function. However, this approach can limit how thin a part can be made and therefore compromise its cosmetic appearance as well as increase its weight. In addition, the optical performance of an embedded wafer may not be as efficient or effective as the performance of a wafer positioned at the optical part's outer surface. For instance, if the wafer has specific reflectance characteristics, they might be adversely affected by being embedded within the optical part due to differences in optical refraction.

Another approach has been to place a planar wafer directly against the molding surface for the optical part. However, if this molding surface has a significantly different curvature from that of the planar wafer, the wafer may not fit or replicate this surface properly, resulting in an optical distortion or incorrect optical power. In addition, the mismatch in shapes can cause irreparable damage to the wafer such as wrinkling, buckling, or burning from inconsistent thermal contact, again causing optical and cosmetic defects in the final optical part.

Pre-forming the wafer to a closer approximation of the desired mold shape might aid in this replication. For straightforward spherical lenses, several techniques have been employed to curve wafers to spherical shapes, including (1) heating and vacuum deforming into an open cavities, and (2) heat- and pressure-forming with matched molding surfaces, as described in U.S. Pat. No. 5,434,707, which is incorporated herein by reference. Vacuum deforming into an opening will only generate a smooth catenary shape, not one having a highly varying curvature. However, while a wafer having a spherical or simple catenary curvature might better approximate a complex shape than does a wafer that is planar, the wafer still might not be sufficiently curved to avoid mismatches that can lead to wrinkling, buckling, or other deformations and damage that contribute to optical distortion and aberration in the final optical part. Such mismatches can be especially problematic when trying to replicate highly asymmetrical shapes, including decentered wrap designs, and multifocal stepped or progressive designs.

Further, although one advantage of using a wafer is that it has a protected, stable construction, the extra thickness of materials associate difficulties in further re-shaping. These difficulties increase as more complex shapes are attempted. An analogy is to compare the relative ease of gift-wrapping a shoebox, as compared to the challenge of gift-wrapping a curved vase. If the wrapping material is cardboard, it obviously will be extremely difficult to accurately contour to the shape of the vase.

It should, therefore, be appreciated that there is a need for an improved method for forming wafers into complex curved shapes, for later incorporation into optical parts having complementary shapes. The present invention fulfills this need and provides further related advantages.

SUMMARY OF THE INVENTION

The present invention resides in an improved method for forming generally planar wafers into complex, asymmetrical shapes, for incorporation into optical parts. The method includes steps of providing a molding surface having a predetermined non-cylindrical, aspheric curved shape, and moving the generally planar wafer into contact with the molding surface, to form the wafer into the desired non-cylindrical, aspheric curved shape. The step of moving is sufficient to form the wafer into the desired non-cylindrical, aspheric curved shape, without the need for additional forming steps. The desired non-cylindrical, aspheric curved shape of the formed wafer complements the shape of a surface of the optical part into which the formed wafer is to be integrated.

In more detailed features of the invention, the predetermined non-cylindrical, aspheric curved shape of the molding surface comprises a multifocal shape, e.g., a progressive multifocal shape, a stepped (flat top) multifocal shape, or a decentered asymmetrical shape.

In another more detailed feature of the invention, the molding surface can be defined by a plastic material. In addition, the step of moving temperature of the wafer, to soften but not melt the wafer.

In other more detailed features of the invention, the step of moving can include a step of rotationally orienting the generally planar wafer relative to the molding surface. This step is useful when the wafer has directional optical properties, e.g., the properties of a polarizer. In this case, the step of providing can include placing at least one guide pin at the perimeter of the molding surface, for facilitating the step of rotationally orienting the generally planar wafer relative to the molding surface.

In yet other more detailed features of the invention, the step of providing can include providing one or more gas egress passageways opening into the molding surface, and the step of moving can include evacuating gas from the space between the molding surface and the wafer, via the one or more gas egress passageways, whereby the wafer can be moved into intimate contact with the molding surface. The step of moving can further include using a soft backing plate to apply a pressure to the surface of the wafer facing away from the molding surface.

A separate and independent aspect of the invention resides in an improved method for forming wafers into complex, asymmetrical shapes, for incorporation into optical parts, wherein the wafer is initially generally planar or simply curved, e.g., spherically curved. The method includes steps of providing a molding surface having a predetermined multifocal curved shape or a decentered non-cylindrical, aspheric curved shape, and moving the wafer into contact with the molding surface, to form the wafer into the desired shape. The step of moving is sufficient to form the wafer into the desired multifocal or decentered curved shape, without the need for additional forming steps. The desired multifocal or decentered curved shape of the formed wafer corresponds generally to the shape of a surface of the optical part into which the formed wafer is to be integrated.

Other features and advantages of the present invention should become apparent from the following description of the preferred methods, taken accompanying drawings, which illustrate, by way of example, the principles of the invention.

DESCRIPTION OF THE PREFERRED METHODS

Figure 1:
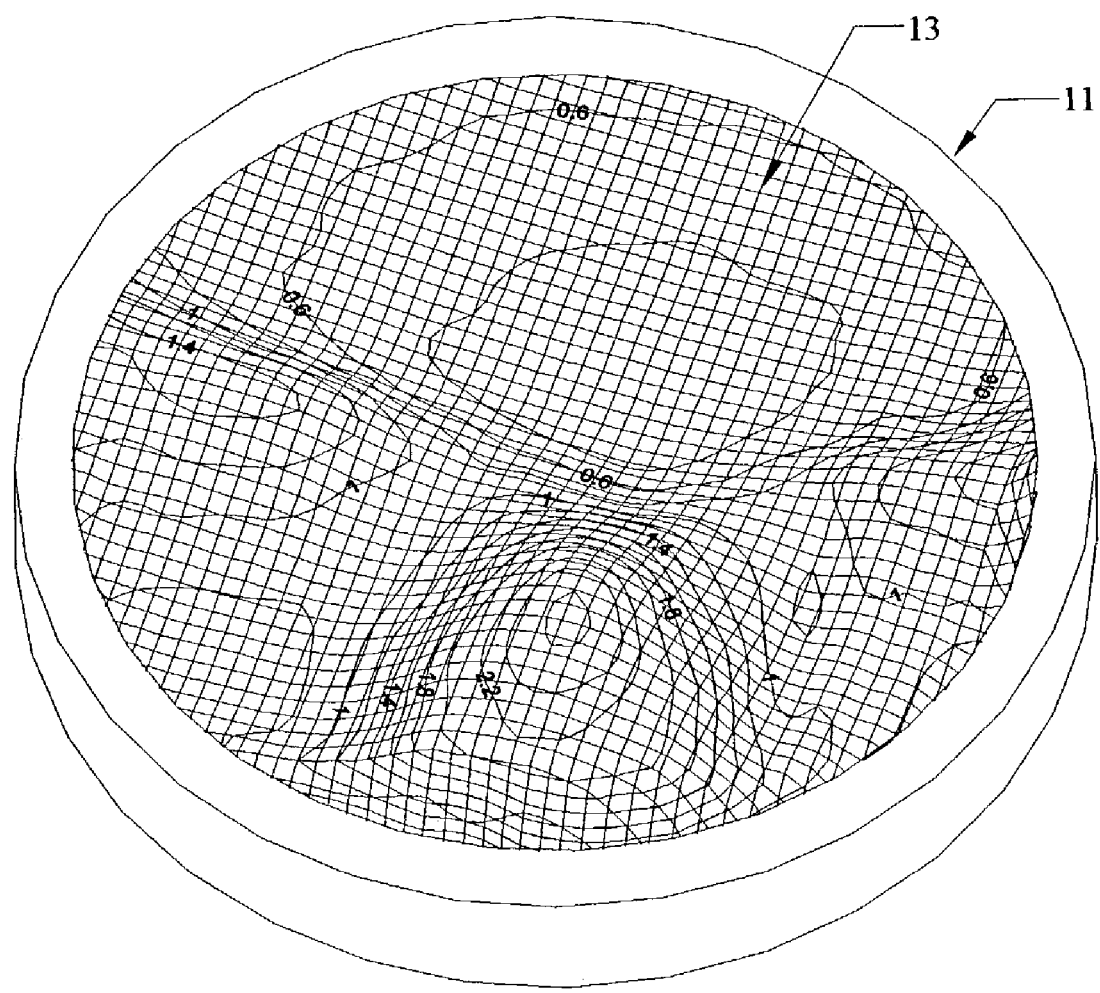
FIG. 1 shows an exemplary mold, having a multifocal progressive shape, for use in forming a generally planar wafer into a complex shape.

As described below and shown in the exemplary drawings, the present invention resides in a simplified method for forming a generally planar wafer into a non-cylindrical, aspheric (i.e., non-spherical) curved shape, for use in an optical part. A wafer is defined as a structure having at least two polymeric layers adhered to each other. One or more of the layers will possess particular desired optical attributes, e.g., selective light transmittance, reflectance or absorbance, polarization properties, color, photochromism, electrochromism, and the like. At least one outer layer possesses desired physical attributes, e.g., protection of the optical attributes, mechanical support for the optical layer, abrasion resistance, impact resistance, chemical resistance, and the like. The layers may be adhered to each other by optical-quality adhesives, mechanical bonding, chemical bonding, or a combination of these means.

In one preferred form, the wafer includes three polymeric layers adhered to each other, with the two outer layers protecting the optical att layer, in this preferred form, is a polarizer film, e.g., a polyvinyl alcohol-based polarizer, which may contain iodine, or other inorganic and organic dichroic dyes. Other polarizer films include, for example, polyvinylene (such as the K and KE polarizers from Polaroid Corp.), and multilayer films such as those described in U.S. Pat. Nos. 5,882,774 and 6,113,811, and references cited in those two patents. The outer layers protect the polarizer film from thermal degradation and from physical damage, and they are bonded to the polarizer film using an optical-quality adhesive. A description of one preferred form of wafer design is provided in U.S. Pat. No. 5,051,309, which is incorporated herein by reference. In this instance, the outer layers are configured not only to protect the inner, polarized layer, but also to enhance the wafer's optical performance.

The wafer structure often is prepared in flat pieces that are larger than the size needed for the optical part. Depending on how the layers are adhered to each other, these flat pieces can be stored as long rolls or sheets of wafer material. Preferably, the wafer-forming process is designed either to use these flat pieces in their created dimensions or to include a cutting step to provide smaller flat pieces for optimal efficiency of wafer usage. For instance, for round lens blanks 76 mm in diameter, it might be preferred to cut flat wafer pieces to rounds of about 76 to 80 mm diameter before continuing with the forming process. Alternately, the forming process can be adapted to use wider flat pieces having optimal spacing of multiple forming molds, to eliminate the need for an initial cutting step.

Two methods for forming a wafer into a complex shape will be described below. In the first method, no rotational or directional orientation of the wafer relative to the mold is required, while in the second method, specific rotational alignment is an essential element of the method.

The method of the present invention is used with a mold having a complex curve molding surface that is complementary to the final shape of the optical part. For instance, if a multifocal progressive lens or lens blank is the final optical part, then the mold should have a similar multifocal progressive shape. This provides the distinct benefit that a wafer formed with this mold will undergo only minimal distortion to replicate the final optical part's contours, and therefore advantageously minimizes physical and optical degradation.

FIG. 1 depicts an exemplary embodiment of a mold 11 having the contours of the front surface of a multifocal progressive lens design. The x and y coordinates map the base plane of the molding surface in mm distances, while the z scale shows the difference in height from this base plane in units of optical power, i.e., diopters. In this exemplary method, a standard design commonly designated as a "6-200 add" is shown. Nominally, this means in a portion of the area of the mold corresponding to the distance viewing portion of the final lens, the mold has a radius of curvature of about 88 mm, which corresponds to 6 diopters of power. As FIG. 1 illustrates, describing this surface in terms of radii is a very loose approximation, because a constant x,y,z relationship is maintained for only short distances anywhere on this complex surface. Instead, the surface is changing continuously and drastically, and its variation from any given location is likely to be defined by different equations in different directions along this surface.

Nonetheless, in the optical industry, it is common to refer to radii of curvature in each of the distance and near viewing areas of a progressive lens design. These areas are typically connected by a corridor of increasing optical power, and for a "200 add" this corresponds to sharpening the curvature of the surface from an area approximated by a local radius of curvature of about 88 mm in the distance viewing region to a value of about 66 mm in the near vision region. This sharpening of curvature creates a near vision region having 2 diopters greater optical power than that defined for the distance viewing area. Therefore, such a design is commonly referred to as a "6-200" progressive design. Beyond this corridor region, it is standard to continuously vary the surface curvature in a manner that minimizes extraneous optical power effects. Thus, the molding surface shown in FIG. 1 follows a marked distortion from a standard spherical shape.

The mold 11 preferably incorporates one or more passageways (not shown) to allow egress of air trapped between the wafer and the molding sur enhanced by drawing an active vacuum through the passageways, for drawing the wafer directly onto the molding surface. These passageways can take the form of minute hole(s) or channel(s) in the mold surface. Such holes should be kept as small as practicable, to minimize distortion of the wafer surface. For a multifocal progressive molding surface, a single minute hole in the center of the molding surface might be sufficient. For more effective air egress, it might be desirable to place one minute hole in the distance viewing region of the mold and another in the near vision, or add, region, where the radius of curvature is markedly different. Alternatively, multiple minute holes can be located throughout the molding surface, although this can increase the initial cost of machining the molds. Another alternative approach could use porous molds, such as sintered metal or ceramic surfaces, which allow egress of air via myriad pores throughout the bulk of the material.

The mold 11 preferably is made of a material capable of maintaining good structural integrity through temperature and pressure cycling, and maintaining good surface finish for the life of the tool. Preferred materials include metal, glass, ceramic, plastics, and composite structures. Stainless steel and aluminum are common metal mold materials, but plastics such as nylon, polypropylene, Teflon®, and Delrin® (both registered trademarks of E.I. du Pont de Nemours and Company Corp.), and composites of glass or metal and polymers also can be used. Plastics and composites are particularly desirable for reasons such as material compatibility, lower cost, and ease of machining complex shapes.

The wafer sheet can be cut to an approximate size and outline similar to the final optical part. For instance, for use with a 76 mm inner diameter round lens mold, the wafer can be cut to approximately a round shape 78 to 80 mm in diameter. The larger size accommodates both shrinkage and deformation of a flat piece into the complex curved shape. Similarly, the sheet can be cut to shapes other than nominal rounds as suitable, e.g., for goggles, visors and face shields. The mold then preferably would have a similarly non-round shape.

In this first exemplary method, no rotational alignment of the wafer with the mold is required. This will be the case when the properties of directional dependence. One example would be a wafer with a uniform tinted color and a scratch-resistant outer layer. In this instance, any suitable manufacturing method of manually or robotically placing the wafer on the mold can be used, without additional alignment procedures.

During forming, the mold is maintained at an elevated temperature to soften but not melt the polymer layers of the wafer. Light pressure urges the wafer into the mold surface, and vacuum is applied to secure the wafer in place and to remove any air trapped between the original wafer surface and the mold.

Interestingly, it was found that successful forming of the planar wafer into a complex shape could be accomplished in a one-step process. This was unexpected, given the complex curves being formed. Previous methods, such as a method described in U.S. Pat. No. 5,997,139, which is incorporated herein by reference, teach that a two-step process utilizing intermediate curving is required to accurately achieve even a two-axis curvature. In contrast, the method of the present invention can shape a flat wafer using a complex curved molding surface without the added time and expense of a multi-step, sequential forming process.

In addition, it has been found that despite the thickness of the wafer construction, the wafer could be formed into a complex curvature without the use of mated molding surfaces. This was unexpected given the complexity of the curves to be attained. It also has been found that the use of a soft backing plate that did not retain a specific shape was sufficient to apply gentle and uniform pressure to the wafer during molding.

Furthermore, it has been found that good replication of a complex shape such as a 6-200 or 6-250 progressive design could be accomplished with the present invention even with a single centrally located air egress passageway. This result was surprising, because given the significant difference in surface curvature of the distance and add regions, it was expected that multiple passageways, such as at least one in the distance region and at least one in the near vision region, would be required both for efficient removal of trapped gas between the wafer and the mold and for drawing the wafer against the complex surface without distorting or wrinkling. While there might yet be production advantages to using multiple passageways, it has been unexpectedly found that this added refinement is not a requirement for the present invention.

In a second exemplary method in accordance with the invention, the wafer must be rotationally aligned with the non-spherical mold, to achieve the correct optical properties in the final optical part. For example, such rotational alignment is required when the wafer is a linear polarizer to be used in eyewear. To meet international product performance standards and to be most effective, such a polarizing wafer must be aligned within 3 to 5 degrees of the horizontal axis of the final lens. Other examples requiring known and consistent rotational alignment include wafers having a gradient tint or gradient reflector, for use in lenses, visors or face shields.

When rotational alignment is required, precision robotic handling might be sufficient to ensure the required positioning. Other approaches can employ optical or physical measurements, or careful visual assessment, to determine essential orientation axes. These and additional methods can then be used to maintain this alignment throughout the forming process. For instance, automatic optical density or polarization measurements, or recognition systems, can be used to control automated positioning equipment to place cut wafers in the correct orientation on the mold.

Figure 3:
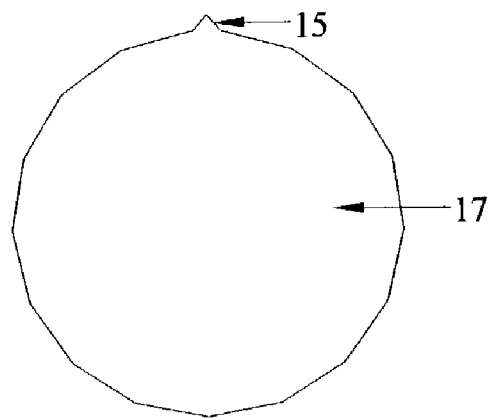
FIGS. 3-5 illustrate several options for aligning a flat cut wafer with the mold of FIG. 1, before forming.
Figure 4:
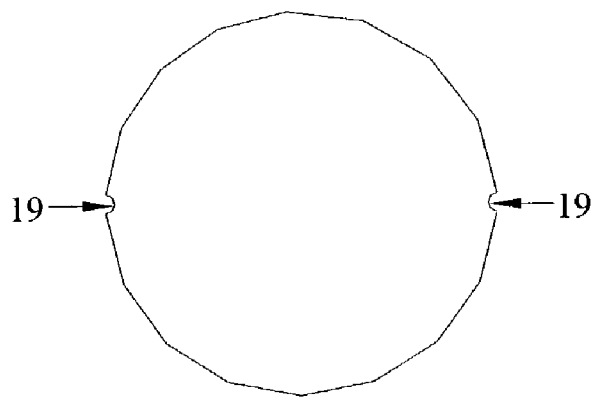
Figure 5:
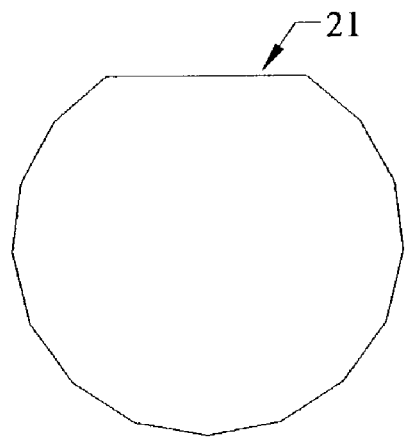

Another approach for rotational alignment is to alter the wafer's peripheral shape by notches, extensions, or other edge features, which can be matched to alignment mechanisms of the molding structure. For instance, as shown in FIG. 3, an extended key 15 is provided in a prescribed position on a polarizing wafer 17, e.g., a position that is exactly perpendicular to the wafer's absorption axis. This key can be matched to a required position on the mold. FIG. 4 shows another approach, in which two notches 19 are cut directly in line with the absorption axis of a polarizing wafer. FIG. 5 shows yet another approach, in which a flat edge 21 is provided, parallel with the wafer's absorption axis.

It is then essential to combine the wafer alignment mechanism with the mold. One approach is to provide a complementary feature on the mold alignment feature present on the wafer. This might be appropriate for some alignment features. However, as mentioned previously, the flat wafer size may be slightly larger than the finished mold size, to accommodate the complex curvature that must occur. Therefore, an exact match might not maintain sufficiently accurate alignment after the wafer has conformed to the mold shape. In addition, there might be difficulties or delays in incorporating such precise initial alignment procedures via automated handling equipment.

Figure 6:
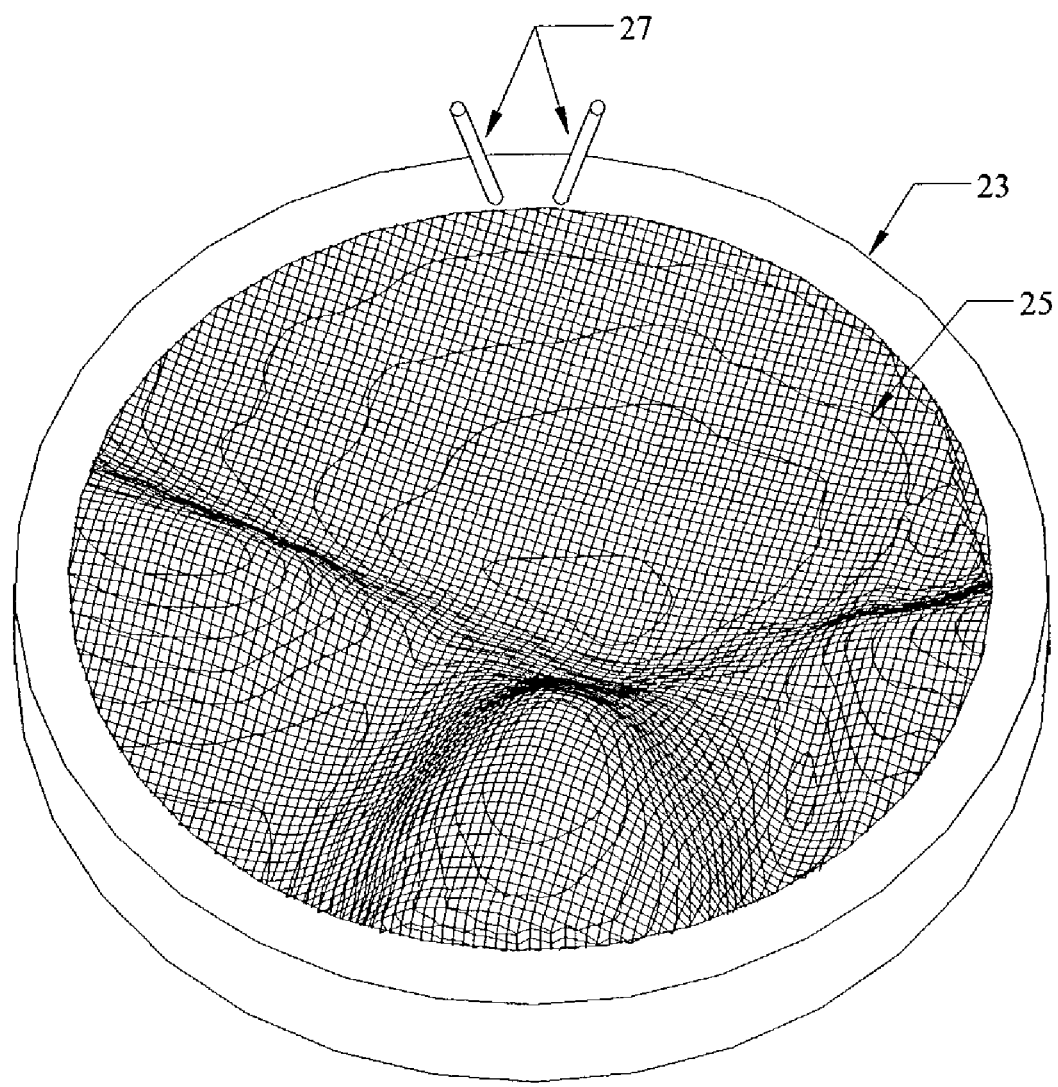
FIG. 6 illustrates one preferred method of aligning a wafer in a specific orientation with respect to a mold surface.

FIG. 6 illustrates an exemplary alternate approach for aligning a wafer 17 like that depicted in FIG. 3 with a mold 23 having a complex molding surface 25. Rather than having a complementary notch for the wafer key 15, the mold includes alignment pins 27 that function to guide the key into the proper rotational alignment relative to the mold. In this example, the bases of the two alignment pins, located at the edge of the molding surface, are spaced the width of the key apart and positioned accurately at 90 degrees 11 degree from the wafer's desired polarization absorption axis. However, for ease of loading the keyed wafers, the pins project upward from the molding surface at a diverging angle from each other and slightly outside the molding surface. This pin configuration enables the wafer key to be captured by the pins over a significantly wider range of acceptance, whereupon the wafer will be guided into proper rotational alignment with the molding surface. A further refinement could be to add auxiliary guide pins at the perimeter of the surface, such as one pin opposite the wafer key, or multiple pins spaced equidistantly around the perimeter of the molding surface 25.

This is but one example of a suitable and preferred alignment mechanism. Another method, for example, for use with the notches shown in FIG. 4, could include large diameter round or oblong pins that match the larger flat wafer diameter, but maintain contact as the wafer is formed to the complex curve of the molding surface. Similarly, a matched linear flat surface, optionally recessed into the mold structure, could align with the flat edge shown on the wafer of FIG. 5. Such flat sections might also be combined with the key or notch mechanisms outlined previously for multiple assurances of alignment.

The figures show a multifocal progressive mold surface as an exemplary complex shape. However, the invention is not limited to this particular shape. Other shapes could include decentered designs with atoricity, multiple axis spherical curvatures, aspheric/atoric designs for wrap-around frames, flat top multifocals with distinct discontinuities in the surface curvature, and other complex designs.

The various features of the present invention can be optimized to ensure improved replication of these various complex shapes. For example, for a flat top multifocal design, one might want a flat top molding surface, with multiple minute holes in the small flat top region, since this area incorporates a large and sudden change from the original flat sheet of the wafer.

Similarly, some complex designs might possess a single axis of rotation for left and right lenses. An example is a centered multifocal progressive design, which is still highly aspheric, but which can be rotated to the right or to the left around a fixed axis, to position the near vision region in the correct orientation. In such an instance, a method of the invention can employ a single mold, with a means of indexing the wafer for either right or left complex curvature. For instance, one method of indexing could use two sets of alignment pins such as those shown in FIG. 6, with these pins offset to the right or to the left from the axis of rotation, to accommodate samples to be formed with either a right or left orientation.

In another instance, alignment of the wafer requires a lateral offset instead of, or in addition to, a rotational orientation. For example, if the wafer contains an embedded symbol such as a product logo or decoration that is designed to appear, e.g., in the upper right hand corner of a resultant optical part, it might be necessary to offset this symbol to a specific location on the mold. Similar alignment mechanisms can be used to orient an offset position as have been suggested for rotational orientation.

In some instances, it might be acceptable only to approximate the curvature of the final complex optical shape rather than exactly replicate it. In such instances, the molded wafer contours closely complement the final complex curvatures expected for the optical part. This complementary shape may be sufficient on its own to follow the final part's contours accurately without optical distortion, even if the wafer yields slightly during the molding process.

Similarly, to accommodate elasticity or relaxation in the wafer material, it might be desirable to use a mold having a more exaggerated complex shape than that planned for the final optical part. For example, if a 6-200 multifocal progressive design is required, and if the wafer has a tendency to relax from its formed shape back toward its original flat construction, it might be desirable to form the wafer to have a more pronounced change in radius into the near vision region, such as a 6-250 add.

Figure 2:
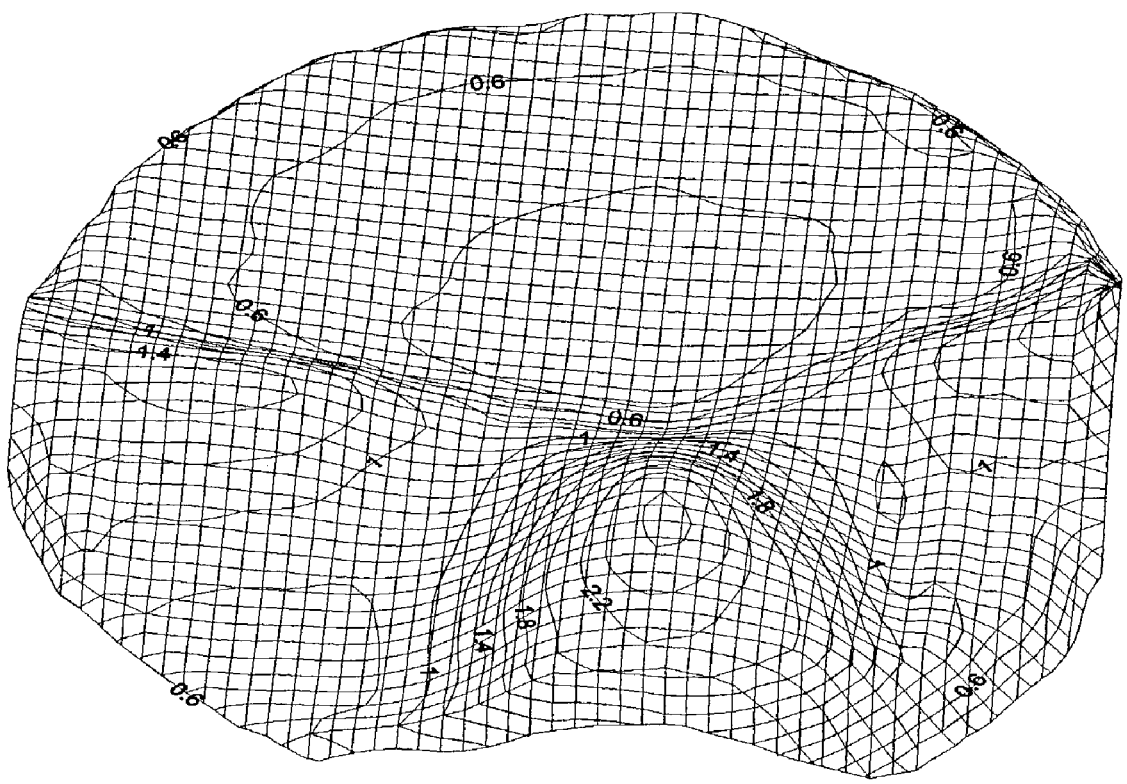
FIG. 2 shows a formed complex-shaped wafer formed using the mold of FIG. 1.

In addition to forming generally planar wafers into complex shapes, the invention also can be used effectively to reshape simply curved wafers to more complex curvatures. For example, a progressive multifocal design such as an "8-300" design requires extensive reshaping from a planar wafer and even more pronounced local surface variation than that illustrated in FIG. 2. However, such extreme shapes can be readily achieved using the present invention by subjecting, for example, a commercially available spherically curved wafer to the described forming process. This offers a distinct and innovative advantage in manufacturing freedom.

The invention will now be described in more specific detail with reference to the following non-limiting example.

EXAMPLE

A stainless steel mold was prepared having the complex shape of a 6-250 design, the design further decentered 2.5 mm from the central mold axis, to better accommodate the vision requirements of a right lens. One egress hole, approximately 1 mm in diameter, was positioned in the geometric center of the molding surface, to allow egress of air. The base fixture holding the mold was further drilled and equipped with alignment pins for a keyed wafer such as the wafer shown in FIG. 4, and with two additional perimeter alignment pins positioned ±120 degrees from this location around the periphery of the mold surface.

The mold was then placed in a commercially available machine used for standard spherical wafer molding, and heated to a temperature of 14

The wafer in this Example comprised a polarizing film sandwiched between two layers of polycarbonate, with the film adhesively bonded to the two polycarbonate layers. The nominal polarizing wafer thickness was 0.6 mm. The wafer construct was cut to nominal round parts 79 mm in diameter, with a key extension like that shown in FIG. 4 to maintain alignment of the polarization absorption axis with the molding surface.

The flat, round cut wafer was warmed to 80 degrees C. and then dropped onto the mold, allowing the alignment pins to guide the flat wafer into the required orientation. A soft silicone backing plate applied light pressure to the outer surface of the flat wafer, to urge it onto the molding surface. This pressure was in the range of about 40 to 80 psi. Thereafter, vacuum was additionally applied, to hold the wafer in place. Standard spherical wafer forming temperatures and cycle times were employed.

After forming, the complex curvature of the wafer was evaluated by Moire deflectometry measurement using a Rotlex (Omer, Israel) OMS-401 instrument. The measurements (in diopter units, D) confirmed that the formed wafer had curved into a progressive shape. In fact, in the distance region, the molded wafer matched the curvature of its mold to within 0.03D, well within the industry standards for even a final optical lens blank (ISO 10322-2 cites a tolerance of ±0.09D). In the near vision region, a slightly lower power of 2.3D, rather than exactly 2.5D, was obtained, but the measurement clearly showed that a significant change in complex curvature had been achieved.

The formed wafer then was placed in a 6-250 mold cavity of an injection molding machine. It was noted that the formed wafer fit snugly against the mold surface without free play or gaps. Standard polycarbonate molding conditions were used to form a 6-250 semi-finished lens blank. The lens blank was measured for optical quality on the OMS-401 instrument and found to be within accepted industry standards (ISO 10322-2) for nominal power, add power and minimal cylinder distortion.

This Example illustrates that even the highly complex shape of a high add (6-250) progressive lens shape can be achieved with the present invention. In addition, this was accomplished in a single step process, rather than the more conventional multi-step processing of gradual, successive curvatures. Surprisingly, this was accomplished using only a single, central small egress passageway, rather than a more complicated mold with multiple passageways. Moreover, only a single complex molding surface was required to achieve this result, rather than matched molding or pressing surfaces.

It should be appreciated from the foregoing description that the present invention provides an improved method for forming a planar wafer into a complex, curved shape, for use in an optical part. The method includes a step of moving the planar wafer into contact with a molding surface having a predetermined non-cylindrical, aspheric curved shape, to form the wafer into a corresponding shape. The step of moving is sufficient, by itself, to form the wafer into the desired non-cylindrical, aspheric curved shape, without the need for additional forming steps.

Although the invention has been described in detail with reference only to the preferred methods, many variations are possible within the concept and scope of the invention. Such variations would become clear to one of ordinary skill in the art after inspection of the specification. The invention therefore is not to be limited except within the spirit and scope of the appended claims.

We claim:

1. A method for forming a generally planar wafer into a desired non-cylindrical, aspheric curved shape configured for subsequent incorporation into an optical part, comprising the steps of:
   providing a molding surface having a predetermined non-cylindrical, aspheric curved multifocal shape;
   elevating the temperature of the generally planar wafer, to soften but not melt the wafer;
   moving the softened wafer into contact with the molding surface, using a soft backing plate to apply a pressure to the surface of the wafer facing away from the molding surface, to form the wafer into the desired non-cylindrical, aspheric curved shape; and
   removing the formed wafer from the molding surface.

2. A method for forming as defined in claim 1, wherein moving is sufficient to form the wafer into the desired non-cylindrical, aspheric curved shape, without the need for additional forming steps.

3. A method for forming as defined in claim 1, wherein the wafer comprises a polarizer.

4. A method for forming as defined in claim 1, wherein the multifocal shape of the molding surface is a progressive multifocal shape.

5. A method for forming as defined in claim 1, wherein the predetermined non-cylindrical, aspheric curved shape of the molding surface is a decentered asymmetrical shape.

6. A method for forming, as defined in claim 1, wherein the molding surface is defined by a plastic material that maintains its structural integrity throughout the forming method.

7. A method for forming as defined in claim 1, wherein moving includes rotationally orienting the softened wafer relative to the molding surface.

8. A method for forming as defined in claim 7, wherein providing includes placing at least one guide pin at the perimeter of the molding surface, for facilitating rotationally orienting the softened wafer relative to the molding surface.

9. A method for forming as defined in claim 1, wherein moving includes offsetting the softened wafer laterally relative to the molding surface.

10. A method for forming as defined in claim 1, wherein:
    providing includes forming one or more gas egress passageways in the molding surface; and
    moving includes evacuating gas from the space between the molding surface and the wafer, via the one or more gas egress passageways, whereby the wafer can be moved into intimate contact wit the molding surface.

11. A method for forming as defined in claim 10, wherein:
    providing includes forming just a single gas egress passageway in the molding surface; and
    moving includes evacuating gas front the space between the molding surface and the wafer, via the single gas egress passageway, whereby the wafer can be moved into intimate contact with the molding surface.

12. A method for forming as defined in claim 1, wherein the desired non-cylindrical, aspheric curved shape of the formed wafer approximates the shape of a surface of an optical part.

13. A method for forming a generally planar wafer into a desired non-cylindrical, aspheric curved shape configured to approximate the shape of a surface of an optical part, comprising:
    providing a mold with a molding surface having a prescribed non-cylindrical, aspheric curved multifocal shape, including incorporating one or more air egress passageways opening in the molding surface;
    elevating the temperature of the generally planar wafer, to soften but not melt the wafer;
    moving the softened wafer into intimate contact with the molding surface, using a soft backing plate to apply a pressure to the surface of the wafer facing away from the molding surface, and further using the one or more gas egress passageways to evacuate gas from the space between the softened wafer and the molding surface, to form the wafer into a corresponding non-cylindrical, aspheric curved shape; and
    removing the formed wafer from the molding surface.

14. A method for forming as defined in claim 13, wherein the predetermined non-cylindrical, aspheric curved shape of the molding surface is a decentered asymmetrical shape.

15. A method for forming as defined in claim 13, wherein the molding surface is defined by a plastic material that maintains its structural integrity throughout the forming method.

16. A method for forming as defined in claim 13, wherein moving includes rotationally orienting the wafer relative to the molding surface.

17. A method for forming as defined in claim 16, wherein providing includes placing at least one guide pin at the perimeter of the molding surface, for facilitating rotationally orienting the generally planar wafer relative to the molding surface.

18. A method for forming as defined in claim 16, wherein the wafer comprises a polarizer.

19. A method for forming a wafer into a desired multifocal curved shape configured for subsequent incorporation into an optical part, comprising:
    providing a wafer that is simply curved;
    providing a molding surface having a predetermined multifocal curved shape;
    elevating the temperature of the wafer, to soften but not melt the wafer;
    moving the softened wafer into contact with the molding surface, using a soft backing plate to apply a pressure to the surface of the wafer facing away from the molding surface, to form the wafer into the desired multifocal curved shape; and
    removing the formed wafer from the molding surface.

20. A method for forming as defined in claim 19, wherein the simply curved wafer has an approximately spherical curvature.

21. A method for forming as defined in claim 19, wherein the predetermined multifocal shape of the molding surface is a progressive multifocal shape.

22. A method for forming as defined in claim 19, wherein the predetermined multifocal shape of the molding surface is a stepped multifocal shape.

23. A method for forming as defined in claim 19, wherein the wafer comprises a polarizer.

24. A method for forming as defined in claim 19, wherein moving includes rotationally orienting the wafer relative to the molding surface.

25. A method for forming a wafer into a desired decentered, non-cylindrical, aspheric curved shape configured for subsequent incorporation into an optical part, comprising:
    providing a wafer that is simply curved;
    providing a molding surface having a predetermined non-cylindrical, aspheric curved shape;
    elevating the temperature of the wafer, to soften but not melt the wafer; and
    moving the softened wafer into contact with the molding surface, using a soft backing plate to apply a pressure to the surface of the wafer facing away from the molding surface, to form the wafer into the desired decentered, non-cylindrical, aspheric curved shape; and
    removing the formed wafer from the molding surface.

26. A method for forming as defined in claim 25, wherein the simply curved wafer has an approximately spherical curvature.

27. A method for forming as defined in claim 25, wherein the wafer comprises a polarizer.

28. A method for forming as defined in claim 25, wherein moving includes rotationally orienting the wafer relative to the molding surface.

29. A method for forming as defined in claim 25, wherein moving includes offsetting the generally planar or simply curved wafer laterally relative to the molding surface.

30. A method for forming as defined in claim 19, wherein:
    providing a molding surface includes forming one or more gas egress passageways in the molding surface; and
    moving includes evacuating gas from the space between the molding surface and the wafer, via the one or more gas egress passageways, whereby the wafer can be moved into intimate contact with the molding surface.

31. A method for forming as defined in claim 25, wherein:
    providing a molding surface includes forming one or more gas egress passageways in the molding surface; and
    moving includes evacuating gas from the space between the molding surface and the wafer, via the one or more gas egress passageways, whereby the wafer can be moved into intimate contact with the molding surface.

* * * * *

UNITED STATES PATENT AND TRADEMARK OFFICE
CERTIFICATE OF CORRECTION

PATENT NO. : 7,326,373 B2  Page 1 of 1
APPLICATION NO. : 10/435402
DATED : February 5, 2008
INVENTOR(S) : Jotinderpal Sidhu et al.

It is certified that error appears in the above-identified patent and that said Letters Patent is hereby corrected as shown below:

At column 2, line 16, "associate" should be -- associated --.
    line 16, after "associated" insert -- with this protected form can bring about --.
    line 52, after "moving" insert -- can include a step of elevating the --.

At column 3, line 23, after "taken" insert -- in conjunction with the --.
    line 60, "att" should be -- attributes --.
    line 60, after "attributes" insert -- of the inner layer. The inner --.

At column 5, line 8, "sur" should be -- surface --.
    line 8, after "surface" insert -- 13. This egress can be --.
    line 50, after "of" insert -- the wafer are uniform and have no --.

At column 6, line 65, after "mold" insert -- structure, to exactly trap the --.

At column 8, line 57, "14" should be -- 140 degress C. --.

At column 10, line 37, "wit" should be -- with --.
    line 41, "front" should be -- from --.

Signed and Sealed this

Twenty-sixth Day of August, 2008

JON W. DUDAS
*Director of the United States Patent and Trademark Office*